(12) United States Patent
Bruns et al.

(10) Patent No.: US 8,869,115 B2
(45) Date of Patent: Oct. 21, 2014

(54) SYSTEMS AND METHODS FOR EMOTIVE SOFTWARE USABILITY

(75) Inventors: Kirk Lars Bruns, Waitsfield, VT (US); Christopher John Olivier, Park Ridge, NJ (US); Piali Das, Park Ridge, NJ (US); Peter Tu, Niskayuna, NY (US); Xiaoming Liu, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 162 days.

(21) Appl. No.: 13/452,329

(22) Filed: Apr. 20, 2012

(65) Prior Publication Data
US 2013/0132931 A1 May 23, 2013

Related U.S. Application Data

(60) Provisional application No. 61/582,095, filed on Dec. 30, 2011, provisional application No. 61/563,318, filed on Nov. 23, 2011.

(51) Int. Cl.
*G06F 9/44* (2006.01)
*G06F 3/01* (2006.01)
(52) U.S. Cl.
CPC .......... *G06F 3/013* (2013.01); *G06F 2203/011* (2013.01); *G06F 9/4443* (2013.01)
USPC ............................. 717/124; 717/125; 717/131
(58) Field of Classification Search
None
See application file for complete search history.

(56) References Cited

U.S. PATENT DOCUMENTS

| 5,676,138 | A |   | 10/1997 | Zawilinski |
| 5,724,262 | A | * | 3/1998 | Ghahramani ................. 702/186 |
| 5,808,908 | A | * | 9/1998 | Ghahramani ................. 702/182 |
| 5,977,968 | A | * | 11/1999 | Le Blanc ...................... 715/706 |
| 5,987,415 | A | * | 11/1999 | Breese et al. ................. 704/270 |
| 6,504,944 | B2 |   | 1/2003 | Mihara et al. |

(Continued)

OTHER PUBLICATIONS

Hua Wang, Mark Chignell, and Mitsuru Ishizuka, Empathic tutoring software agents using real-time eye tracking, [Online] 2006, In Proceedings of the 2006 symposium on Eye tracking research & applications (ETRA '06), [Retrieved from the Internet] <http://delivery.acm.org/10.1145/1120000/1117346/p73-wang.pdf>, pp. 73-78.*

(Continued)

*Primary Examiner* — Thuy Dao
*Assistant Examiner* — Ravi K Sinha
(74) *Attorney, Agent, or Firm* — Hanley, Flight & Zimmerman, LLC

(57) ABSTRACT

Systems and methods are disclosed for emotive healthcare software usability. A method to improve software usability is described, the method comprising presenting a software application to a user. The method also including logging activities of the user with respect to the software application, wherein the logging includes recording the user using the software application, and wherein the activities include user action with respect to the software application and mouse location on a user interface displaying the software application. The method also including interpreting user emotion from the recording, and tracking an emotive index based on a combination of user emotion and user action with respect to the software application and mouse location. The method also including providing feedback based on the emotive index.

21 Claims, 10 Drawing Sheets

(56) References Cited

U.S. PATENT DOCUMENTS

| | | | |
|---|---|---|---|
| 6,731,307 B1* | 5/2004 | Strubbe et al. | 715/727 |
| 7,099,893 B2* | 8/2006 | Bischof et al. | 717/124 |
| 7,152,016 B2* | 12/2006 | Ohyama et al. | 717/131 |
| 7,158,097 B2* | 1/2007 | Taylor et al. | 345/8 |
| 7,374,536 B1 | 5/2008 | Taylor | |
| 7,665,068 B2* | 2/2010 | Neumann et al. | 717/125 |
| 7,720,784 B1 | 5/2010 | Froloff | |
| 7,930,676 B1* | 4/2011 | Thomas | 717/100 |
| 8,271,950 B2* | 9/2012 | Bharadwaj | 717/131 |
| 8,448,138 B2* | 5/2013 | Chang et al. | 717/124 |
| 8,621,416 B1* | 12/2013 | Thomas | 717/100 |
| 8,713,438 B1* | 4/2014 | Broniek et al. | 715/715 |
| 2001/0037222 A1 | 11/2001 | Platt et al. | |
| 2004/0075645 A1* | 4/2004 | Taylor et al. | 345/157 |
| 2004/0267099 A1 | 12/2004 | McMahon et al. | |
| 2005/0200486 A1 | 9/2005 | Greer | |
| 2005/0251423 A1 | 11/2005 | Bellam et al. | |
| 2006/0047538 A1 | 3/2006 | Condurso et al. | |
| 2006/0116557 A1 | 6/2006 | Moore et al. | |
| 2007/0034213 A1 | 2/2007 | Poisner | |
| 2007/0265507 A1 | 11/2007 | De Lemos | |
| 2007/0288300 A1 | 12/2007 | Vandenbogart et al. | |
| 2007/0300185 A1* | 12/2007 | Macbeth et al. | 715/825 |
| 2008/0004904 A1 | 1/2008 | Tran | |
| 2008/0141221 A1* | 6/2008 | Benesovska et al. | 717/124 |
| 2009/0235236 A1* | 9/2009 | Nickerson et al. | 717/128 |
| 2010/0064282 A1* | 3/2010 | Triou et al. | 717/125 |
| 2010/0293527 A1* | 11/2010 | Austin et al. | 717/131 |
| 2010/0306678 A1* | 12/2010 | Kulas | 715/760 |
| 2011/0087974 A1* | 4/2011 | Kulas | 715/760 |
| 2011/0154293 A1* | 6/2011 | Dharwada et al. | 717/125 |
| 2012/0167035 A1* | 6/2012 | Han et al. | 717/104 |
| 2012/0330182 A1* | 12/2012 | Alberts et al. | 600/558 |
| 2013/0219365 A1* | 8/2013 | Rago et al. | 717/125 |

OTHER PUBLICATIONS

Zhai, J.; Barreto, A.B.; Chin, C.; Chao Li, Realization of stress detection using psychophysiological signals for improvement of human-computer interactions, [Online] 2005, SoutheastCon, 2005. Proceedings. IEEE Apr. 8-10, 2005, [Retrieved from the Internet] <http://ieeexplore.ieee.org/stamp/stamp.jsp?tp=&arnumber=1423280>, pp. 415-420.*

Manhartsberger, Martina and Zellhofer, Norbert, Eye Tracking in Usability Research: What Users Really See, [Online] 2005, Usability Symposium, 2005, [Retrieved from the Internet] <http://www.usability.at/download/EyetrackinginUsability.pdf>, Total pp. 13.*

Helen Petrie and Chandra Harrison, Measuring users' emotional reactions to websites, [Online] 2009, In CHI '09 Extended Abstracts on Human Factors in Computing Systems (CHI EA '09). ACM, [Retrieved from the Internet] <http://delivery.acm.org/10.1145/1530000/1520582/p3847-petrie.pdf>, pp. 3847-3852.*

Lombardi, Candace, "MIT Group Develops 'Mind-Reading' Device," CNET News, Apr. 4, 2006, retrieved from http://news.cnet.com/MIT-group-develops-mind-reading-device/2100-1008_3-6057638.html on Mar. 6, 2012, 4 pages.

Essa, Irfan A. et al., "A Vision System for Observing and Extracting Facial Action Parameters," IEEE CVPR 1994 Conference, Jun. 1994, pp. 76-83 (8 pages).

Essa, Irfan A. et al., "Coding, Analysis, Interpretation, and Recognition of Facial Expressions," IEEE Transactions on Pattern Analysis and Machine Intelligence, vol. 19, No. 7, Jul. 1997, pp. 757-763 (6 pages).

Grunau, E. et al., "Bedside Application of the Neonatal Facial Coding System in Pain Assessment of Premature Neonates," Pain 76, 1998, pp. 277-286 (10 pages).

Chapman, C. R. et al., "Pain Measurement: an Overview," Pain 22, 1985, pp. 1-31 (31 pages).

"Other Methods of Rating Pain," The Risk Communication Institute, retrieved from http://www.riskcomm.com/visualaids/painscales/othermethods.php on Mar. 6, 2012, 2 pages.

Lisett, C. et al., "Developing Multimodal Intelligent Affective Interfaces for Tele-Home Health Care," International Journal of Human-Computer Studies, vol. 59, Issues 1-2, Jul. 2003, pp. 245-255 (11 pages).

Schultz, A. et al., "Preverbal Early Verbal Pediatric Pain Scale (PEPPS): Development and early psychometric testing," J Pediatric Nursing, 14, 1999, pp. 19-27 (2 pages).

Gunes, H. et al., "Face and Body Gesture Recognition for a Vision-Based Multimodal Analyzer," Australian Computer Society, Inc. Conferences in Research and Practice in Information Technology, vol. 36, 2004, 10 pages.

Turk, Dennis C. et al., "Handbook of Pain Assessment," Second Edition, The Guilford Press, 2001, 20 pages.

\* cited by examiner

SYSTEMS AND METHODS FOR EMOTIVE SOFTWARE USABILITY

RELATED APPLICATION

This patent claims priority to U.S. Provisional Application Ser. No. 61/582,095, entitled "Systems and Methods for Emotive Healthcare Software Usability," which was filed on Dec. 30, 2011, and U.S. Provisional Application Ser. No. 61/563,318, entitled "Systems and Methods for Emotive Healthcare Software Usability," which was filed on Nov. 23, 2011, each of which is hereby incorporated herein by reference in its entirety.

FIELD OF THE DISCLOSURE

This disclosure relates generally to software usability and, more particularly, to systems and methods for emotive software usability.

BACKGROUND

Software may provide a wide variety of very useful tools and functional features depending on the industry and associated application of the software.

BRIEF SUMMARY

Certain examples provide methods and systems for improving software usability. An example method includes logging activities of a user with respect to a software application, wherein the logging includes recording the user using the software application and wherein the activities include user action with respect to the software application and mouse location on a user interface displaying the software application. The example method includes interpreting user emotion from the recording. The example method includes tracking an emotive index based on a combination of user emotion and user action with respect to the software application and mouse location. The example method includes providing feedback based on the emotive index.

Another example includes a computer readable storage medium including computer program code to be executed by a processor, the computer program code, when executed, to implement a method to improve software usability. The example method includes logging activities of a user with respect to a software application, wherein the logging includes recording the user using the software application and wherein the activities include user action and reaction with respect to the software application and mouse location on a user interface displaying the software application. The example method includes interpreting user emotion from the recording. The example method includes tracking an emotive index based on a combination of user emotion and user action and reaction with respect to the software application and mouse location. The example method includes providing feedback based on the emotive index.

An example system includes a processor and an interface to display a software application to a user. The example system includes a logging mechanism to log activities of the user with respect to the software application, and wherein the activities include user action with respect to the software application and mouse location on the user interface displaying the software application. The example system includes a processor to interpret user emotion from the recording. The example system includes a processor to track an emotive index based on a combination of user emotion and user action with respect to the software application and mouse location. The example system includes providing feedback based on the emotive index.

DETAILED DESCRIPTION

Figure 1:
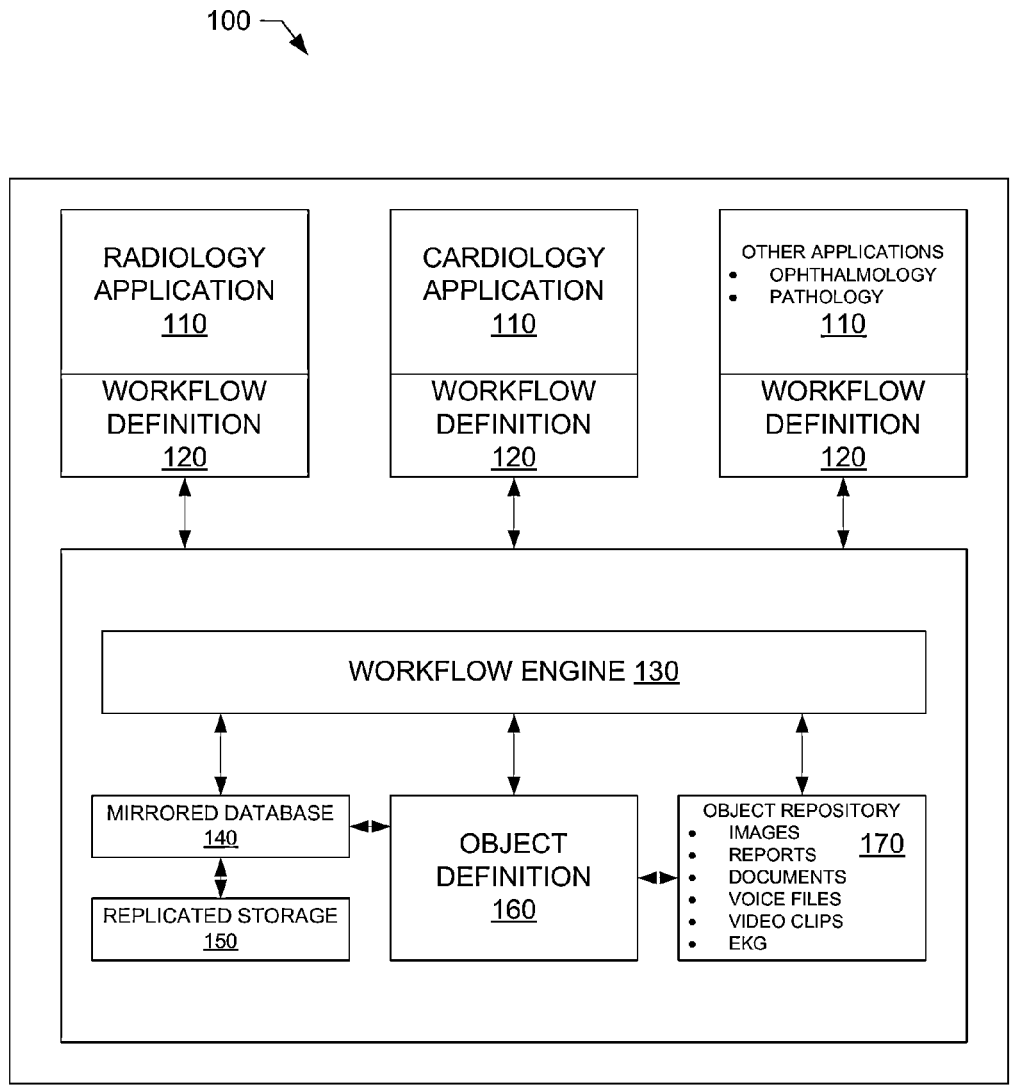
FIG. 1 is an illustration of an example functional block diagram of portions of an information system for a healthcare enterprise.

Often, software may provide a wide variety of very useful tools and functional features based on the industry and associated application of the software. However, it may become overwhelming to determine what area, function, or feature does not provide a pleasing and efficient user interface and workflow to the user. Many times, software customers complain the features and functionality of the software are not intuitive. For example, the location of a feature may not be located where the software user would expect it to be located on the user interface. However, engineering teams and software design groups struggle to precisely identify which exact step in the workflow users have difficulty handling. Moreover, each user often will have his or her own preferences and desired workflow. The lack of precise data about the emotions of the users simultaneously combined with the actual user events in the product restrict software engineers from identifying the root-cause of the "un-intuitiveness" of a feature and how and/or where to make improvements.

In some examples, rather than focusing on time involved, focusing on events logged may provide additional insight into the user experience. A combination of log data plus gaze detection and mouse position may be analyzed and overlapped to identify points of good/bad user experience, bottlenecks, issues, trends, etc. Certain examples may provide playback of a combination of video, gaze tracking and user action data in conjunction with log data to allow a software reviewer to see a combination of screen capture plus user gaze (e.g., eye representation), mouse movement (e.g., shown as lines on a screen), emotive graph (e.g., minimal or elevated positive or negative reaction), and listing of actions taken (e.g., with date and time). A software reviewer (e.g., a human and/or program) may then review captured samples to identify common areas/activities/events/aspects evoking positive and/or negative reactions, for example.

Some examples may provide quick, real-time feedback versus more stilted or forced responses from a typical postsession questionnaire or survey of the user. Rather than changing an entire product or feature set, certain examples may facilitate focus on a particular problem, thereby reducing the effort needed to change the software and reducing a chance of causing a problem, concern or user dislike in another area. Some examples may provide real-time feedback with suggestions, alternatives, reconfigurations, etc., for that user (in addition to sending data back to a program and/or software reviewer for analysis).

Using the described methods and system, a software user is provided with an ability to accumulate and aggregate the precise user data points which software teams may utilize to improve the workflow and overall usability of the product. Software reviewers may also determine a configuration of the functions, features, and toolsets which would be optimal or at least better for the users.

Certain examples provide a combined aggregate dataset with user workflow detection including logging of events, mouse location, and gaze location identification which is combined with emotive determination to provide an exact and precise identification where a user may become particularly frustrated or satisfied with the software. Certain examples may use a camera (e.g., video, still, etc.) to detect gaze location on a monitor and may combine such data with an algorithmic determination of emotion (e.g., positive or negative reaction) which is then aggregated with robust logging.

Certain examples may be implemented and/or used in conjunction with an information system for hardware enterprise, including a Picture Archiving and Communication System ("PACS"). FIG. 1 is a block diagram illustrating an example business and application information system. A system 100 of FIG. 1 includes a clinical application 110 and a workflow definition 120 for each application 110. The example system 100 also includes a workflow engine 130, a mirrored database 140, a replicated storage 150, an object definitions database 160 and an object repository 170.

In some examples, application 110 may be a clinical application. For example, application 110 may be a radiology, cardiology, ophthalmology, and/or pathology application.

The workflow definition 120 may communicate with a workflow engine 130. The example workflow engine 130 may be in communication with the mirrored database 140, the object definitions database 160, and the object repository 170. In some examples, the mirrored database 140 may be in communication with a replicated storage 150. An example object repository 170 may include data such as, for example, images, reports, documents, voice files, video clips, EKG information, etc.

Figure 2:
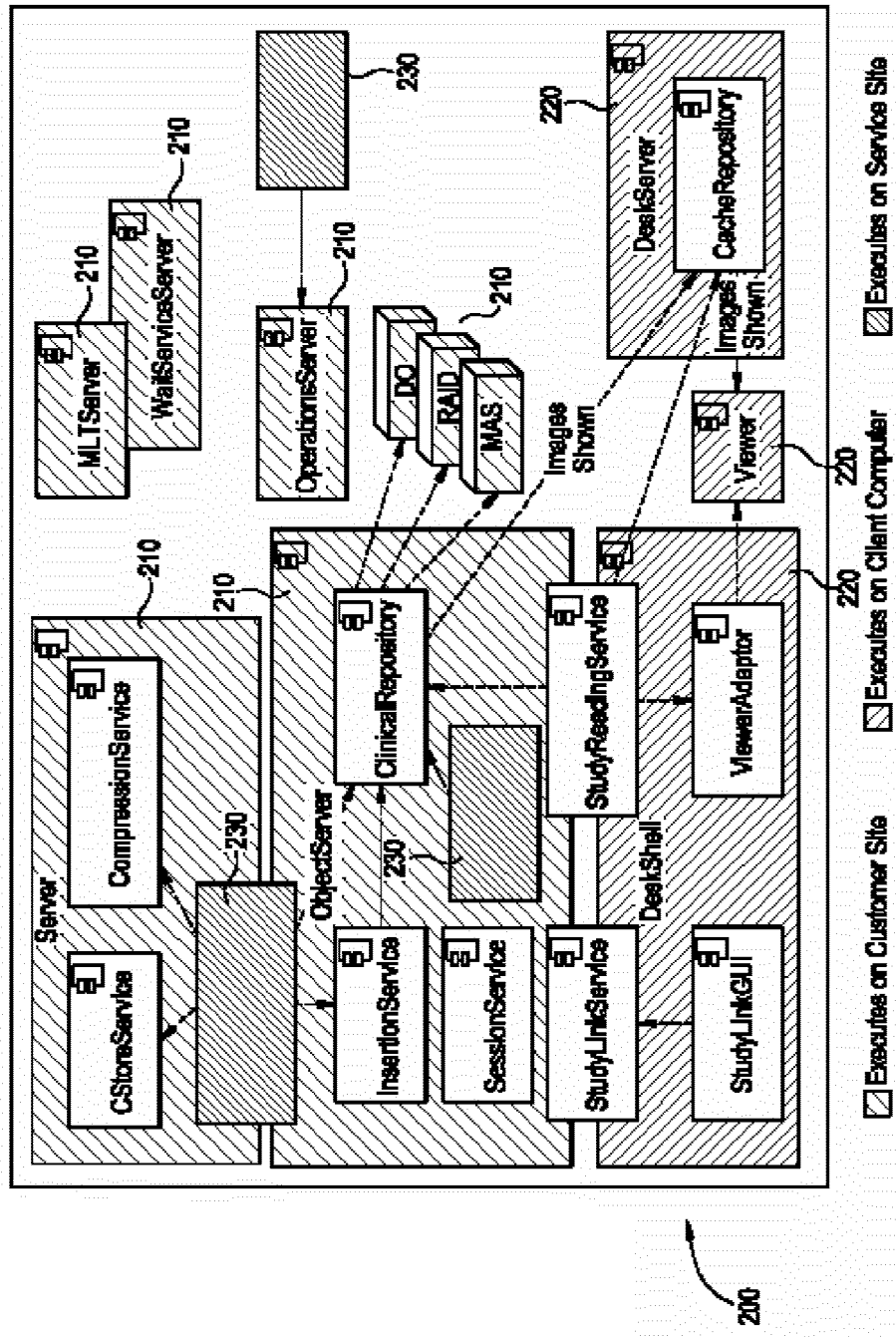
FIG. 2 is an illustration of an example functional block diagram of portions of an information system which delivers application and business goals.

An embodiment of an information system which delivers application and business goals is presented in FIG. 2. The information system 200 of FIG. 2 demonstrates services divided among a service site 230, a customer site 210, and a client computer 220. For example, a DICOM Server, HL7 Server, Web Services Server, Operations Server, database and other storage, an Object Server, and a Clinical Repository may execute on an example customer site 210. An example client computer 220 may include executing a Desk Shell, a Viewer, and a Desk Server. A DICOM Controller, Compiler, and the like may execute on a service site 230. Thus, operational and data workflow may be divided, and only a small display workload may be placed on the client computer 220, for example.

Certain embodiments may provide an architecture and framework for a variety of clinical applications. For example, the framework may include front-end components (e.g., a Graphical User Interface ("GUI")) and may be a thin client and/or a thick client system to varying degree, with some or all applications and processing executing on a client workstation, on a server, and/or running partially on a client workstation and partially on a server, for example.

Figure 3:
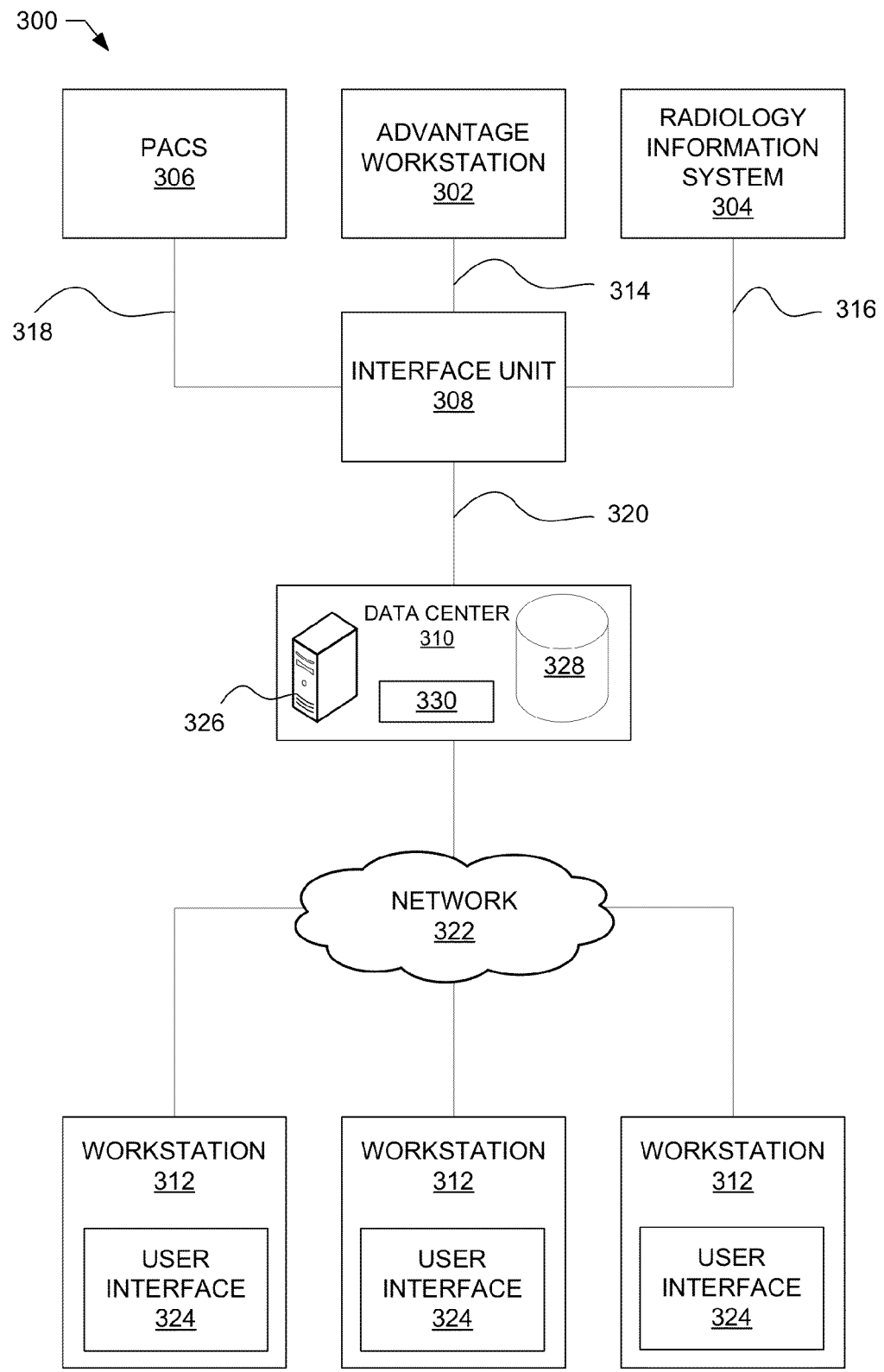
FIG. 3 is a block diagram of an example clinical information system capable of implementing the example methods and systems described herein.

FIG. 3 illustrates an example block diagram of an example clinical information system 300 capable of implementing the example methods and systems described herein. The example clinical information system 300 may include a clinical application such as, for example, an advantage workstation ("AW") 302, a product of GENERAL ELECTRIC®. The example clinical information system 300 may also include a radiology information system ("RIS") 304, a picture archiving and communication system ("PACS") 306, an interface unit 308, a data center 310, and a plurality of workstations 312. In the example embodiment illustrated in FIG. 3, the AW 302, the RIS 304, and the PACS 306 are housed in a healthcare facility and locally archived. However, in other implementations, the AW 302, the RIS 304, and/or the PACS 306 may be housed at one or more suitable locations. In some embodiments, one or more of the example information systems (e.g., the PACS 306, the RIS 304, and/or the AW 302) may be implemented remotely via a thin client and/or downloadable software solution. Furthermore, one or more components of the example clinical information system 300 may be combined and/or implemented together. For example, the RIS 304 and/or the PACS 306 may be integrated with the AW 302; the PACS 306 may be integrated with the RIS 304; and/or the three example information systems (e.g., the AW 302, the RIS 304, and/or the PACS 306) may be integrated together. In other example implementations, the clinical information system 300 includes a subset of the illustrated information systems (e.g., the AW 302, the RIS 304, and/or the PACS 306). For example, the clinical information system 300 may include only one or two of the AW 302, the RIS 304, and/or the PACS 306. Preferably, information (e.g., image data, image analysis, processing, scheduling, test results, observations, diagnosis, etc.) is entered into the AW 302, the RIS 304, and/or the PACS 306 by healthcare practitioners (e.g., radiologists, physicians, and/or technicians) before and/or after patient examination.

An example AW 302 may provide post-processing and synergized imaging techniques across CT, MRI, PET, SPECT, Interventional, etc. technologies. The example AW 302 may provide 2D, 3D, and/or 4D post-processing workstations as well as facilitate remote review and sharing of images in real-time. The example AW 302 may also be used for 3D or Advanced PACS applications.

An example RIS 304 may store information such as, for example, radiology reports, messages, warnings, alerts, patient scheduling information, patient demographic data, patient tracking information, and/or physician and patient status monitors. Additionally, the example RIS 304 may enable exam order entry (e.g., ordering an X-ray of a patient) and image and film tracking (e.g., tracking identities of one or more people who have checked out a film). In some examples, information in the example RIS 304 may be formatted according the HL-7 (Health Level Seven) clinical communication protocol.

An example PACS 306 may store medical images (e.g., X-rays, scans, three-dimensional renderings, etc.) as, for example, digital images in a database or registry. In some examples, the medical images may be stored in the example PACS 306 using the Digital Imaging and Communications in Medicine ("DICOM") format. Images may be stored in the example PACS 306 by healthcare practitioners (e.g., imaging technicians, physicians, radiologists) after a medical imaging of a patient and/or are automatically transmitted from medical imaging devices to the example PACS 306 for storage. In some examples, the PACS 306 may also include a display device and/or viewing workstation to enable a healthcare practitioner to communicate with the example PACS 306.

In some examples, additional, or alternative, information systems may be included such as, for example, a Laboratory Information System ("LIS") and/or an Electronic Medical Records System ("EMR"). In some examples, a laboratory information system interface connection and/or an electronic medical records system interface connection may be included in the clinical information system 300 and may facilitate communication between the clinical application and an interface unit 308.

An example interface unit 308 may include a hospital information system interface connection 314, a radiology information system interface connection 316, a PACS interface connection 318, and a data center interface connection 320. The interface unit 308 facilitates communication among an example AW 302, an example RIS 304, an example PACS 306, and or an example data center 310. The example interface connections (e.g., the hospital information system interface connection 314, the radiology information system interface connection 316, the PACS interface connection 318, and the data center interface connection 320) may be implemented by, for example, a Wide Area Network ("WAN") such as a private network or the Internet. Accordingly, the example interface unit 308 may include one or more communication components such as, for example, an Ethernet device, an asynchronous transfer mode ("ATM") device, an 802.11 device, a DSL modem, a cable modem, a cellular modem, etc. In turn, the example data center 310 may communicate with a plurality of workstations 312 via a network 322 and implemented at a plurality of locations (e.g., a hospital, clinic, doctor's office, other medical office, or terminal, etc.). The example network 322 may be implemented by, for example, the Internet, an intranet, a private network, a wired or wireless Local Area Network, and/or a wired or wireless WAN. In some examples, the example interface unit 308 may also include a broker (e.g., a Mitra Imaging's PACS Broker) to allow medical information and medical images to be transmitted together and stored together.

In operation, the example interface unit 308 may receive images, medical reports, administrative information, and/or other clinical information from the example information systems (e.g., the AW 302, the RIS 304, and/or the PACS 306) via the example interface connections (e.g., the hospital information system interface connection 314, the radiology information system interface connection 316, and the PACS interface connection 318). If necessary (e.g., when different formats of the received information are incompatible), the example interface unit 308 may translate or reformat (e.g., into Structured Query Language ("SQL") or standard text) the medical information, such as medical reports, to be properly stored at the example data center 310. Preferably, the reformatted medical information may be transmitted using a transmission protocol to enable different medical information to share common identification elements, such as, for example, a patient name or social security number. Next, the example interface unit 308 may transmit the medical information to the example data center 310 via the example data center interface connection 320. Finally, medical information may be stored in the example data center 310 in, for example, the DICOM format, which enables medical images and corresponding medical information to be transmitted and stored together.

The medical information may be viewable later and retrievable at one or more of the example workstations 312 (e.g., by their common identification element, such as, for example, a patient name or record number). The example workstations 312 may be any equipment (e.g., a personal computer) capable of executing software which permits electronic data (e.g., medical reports) and/or electronic medical images (e.g., X-rays, ultrasounds, MRI scans, etc.) to be acquired, stored, or transmitted for viewing and operation. The example workstations 312 may receive commands and/or other input from a software user (e.g., a healthcare practitioner such as, for example, an imaging technician, physician, radiologist, etc.) via, for example, a keyboard, mouse, track ball, microphone, etc. As shown in FIG. 3, the example workstations 312 may be connected to the network 322 and, thus, may communicate with each other, the example data center 310, and/or any other device coupled to the network 322. The example workstations 312 may be capable of implementing an example user interface 324 to enable a healthcare practitioner to interact with the example clinical information system 300. For example, in response to a request from a physician, the example user interface 324 may present a patient medical history. Additionally, the example user interface 324 may include one or more options related to the example methods and apparatus described herein to organize such a medical history using classification and severity parameters.

The example data center 310 of FIG. 3 may be an archive to store information such as, for example, images, data, medical reports, and/or, more generally, patient medical records. In addition, the example data center 310 may also serve as a central conduit to information located at other sources such as, for example, local archives, hospital information systems/radiology information systems (e.g., the example AW 302 and/or the example RIS 304), or medical imaging/storage systems (e.g., the example PACS 306 and/or connected imaging modalities). That is, the example data center 310 may store links or indicators (e.g., identification numbers, patient names, or record numbers) to information. In the illustrated example of FIG. 3, the example data center 310 may be managed by an application server provider ("ASP") and be located in a centralized location which may be accessed by a plurality of systems and facilities (e.g., hospitals, clinics, doctor's offices, other medical offices, and/or terminals). In some examples, the example data center 310 may be managed by an ASP including Cloud-based networking offerings such as, for example, a private cloud, a hosted cloud, an ASP cloud, a community cloud, and/or a hybrid cloud. For example, the example data center 310 may exist partially or wholly in a private cloud. In some examples, the data center 310 may be spatially distant from the example AW 302, the example RIS 304, and/or the example PACS 306 (e.g., at GENERAL ELECTRIC® headquarters). In certain embodiments, the example AW 302 may be integrated with one or more of the example PACS 306, RIS 304, etc., via a messaging framework and viewer.

In some examples, communication within the clinical information system 300 may include platforms operating on Virtual Machines ("VMs"). For examples, at least a clinical application, a data center, and/or a workstation may be operating within the clinical information system 300 and may be running on at least a computer running a VM. In some examples, an example computer running a VM may be remotely located from the clinical information system 300.

The example data center 310 of FIG. 3 may include a server 326, a database 328, and a record organizer 330. The example server 326 may receive, process, and convey information to and from the components of the example clinical information system 300. The example database 328 may store the medical information described herein and may provide access hereto. The example record organizer 330 may manage patient medical histories, for example. The example record organizer 330 may also assist in procedure scheduling, for example.

While an example manner of implementing the methods and systems described herein has been illustrated in FIG. 3, one or more of the elements, processes and/or devices illustrated in FIG. 3 may be combined, divided, re-arranged, omitted, eliminated and/or implemented in any other way. Further, the example methods and systems described herein of FIG. 3 may be implemented by hardware, software, firmware and/or any combination of hardware, software and/or firmware. Thus, for example, any of the examples could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the method or system claims of this patent are read to cover a purely software and/or firmware implementation, at least one of the example elements are hereby expressly defined to include a tangible computer readable medium such as a memory, DVD, CD, Blu-ray, etc. storing the software and/or firmware. Further still, the example methods and systems of FIG. 3 may include one or more elements, processes and/or devices in addition to, or instead of, those illustrated in FIG. 3, and/or may include more than one of any or all of the illustrated elements, processes and devices.

Figure 4:
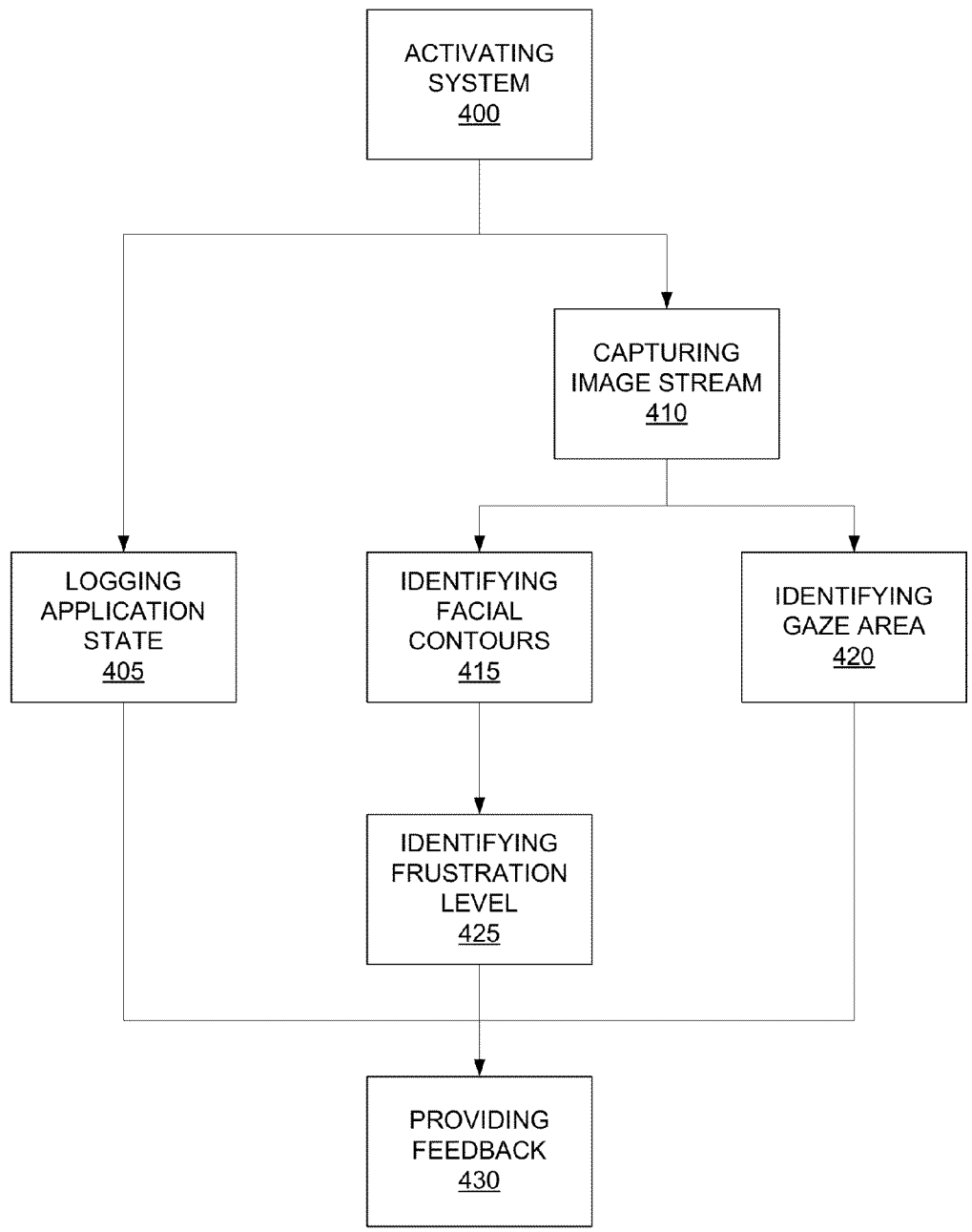
FIG. 4 is an example of a high level representation of a method according to an embodiment of the invention.

A flowchart representative of example machine readable instructions for implementing the methods and system described herein is shown in FIG. 4. In this example, the machine readable instructions comprise a program for execution by a processor such as the processor 812 shown in the example computer 800 discussed below in connection with FIG. 8. The program may be embodied in software stored on a tangible computer readable medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 4, many other methods of implementing the example methods and systems may alternatively be used. For example, the order of execution of the blocks may be changed, and/or some of the blocks described may be changed, eliminated, or combined.

As mentioned above, the example processes of FIG. 4 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIG. 4 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The system illustrated in FIG. 4 begins by activating the monitoring software (block 400). In some examples, activating the monitoring software may include actively executing (e.g., opening and initiating) the monitoring software. In some examples, the monitoring software may be integrated into a software application such as, for example, the clinical application 110 of FIG. 1. In some examples, the monitoring software may automatically execute when the software application (e.g., clinical application 110) being monitored is executed.

In some examples, once the monitoring software is activated (block 400), the monitoring software may begin logging the application state (block 405). For example, the monitoring software may begin logging the mouse location while the software user operates the software application. In some examples, the monitoring software may begin logging user actions (e.g., selecting a feature or function). In some examples, the monitoring software may log (e.g., capture) the user interface screens while the software user operates the software application. In some examples, the date and time may be associated with each logged application state event. In some examples, the monitoring software may continue to log the application state until the software user ends (e.g., closes) the software application.

In some examples, in addition to logging the application state, the monitoring software may also begin capturing an image stream of the software user while the user operates the software application via a camera (block 410). For example, the camera (e.g., camera 510 of FIG. 5) may focus on the user's face and capture changes in the user's expression as the software user continues to operate the software application. In some examples, the example image stream may be a video stream. In some examples, the image stream may be a still image stream. In some examples, the monitoring software may continue capturing the example image stream until the user ends (e.g., closes) the software application.

In some examples, the monitoring software may then input the captured image stream into a facial recognition application. For example, the monitoring software may input the captured image stream into an emotive gaze determination and emotion algorithm system. The example facial recognition application may perform an analysis of the user's face and determine the facial contours (block 415). For example, the facial recognition application may be able to identify the changing facial expressions of the user over time such as, for example, when the user changes from having a smile to having a furrowed brow. In some examples, the example gaze determination algorithm may be able to identify where the software user was focusing on the monitor while using the software application (block 420). In some examples, the example facial recognition application may also begin identifying the software user's emotive level (e.g., positive, neutral, and/or negative) over time from the captured image stream (block 425). For example, the example emotive gaze determination and emotion algorithm system may be able to identify characteristics of the facial contours and correlate the characteristics with an emotive level index such as, for example, lines on the face indicating a positive reaction (e.g., a smile) and/or a negative reaction (e.g., furrowed brow).

In some examples, the monitoring software may begin providing feedback by feeding the example facial recognition algorithm's results (e.g., the software user's emotive level over time) and the logged application state data (e.g., mouse location, user actions, etc.) to a software simulator (block 430). In some examples, the example feedback may include a playback of a combination of recorded video of the software user (e.g., the image stream), gaze tracking of the user, and user action data in conjunction with log data (e.g., application state data). In some examples, the example feedback may include providing a combination of screen capture (e.g., user interface screens) plus user gaze representations (e.g., indicators on the screen where the user was focused), mouse movements, emotive graph (e.g., frustration and satisfaction levels over time), and listing of user actions (e.g., application state data) taken during operation of the software application. In some examples, the mouse movements may include drawing lines on a screen representative of the software user's mouse movements while operating the software application.

In some examples, as software users interact with software applications, computer vision systems and methods may capture emotional cues such as facial expression and gaze direction. When coupled with mouse location, process state information (e.g., system event logs and user actions), and actual user interface interaction screens captured at key moments, inferences may be made and insights may be discovered regarding exactly when and where a given user becomes frustrated and/or satisfied with the software. In some examples, the software user may learn or be trained by reviewing the inferences made. For example, by reviewing the feedback, a software user may adapt use of the software application to make operating software application more efficient. In some examples, a software team reviewing the feedback may modify workflow definitions to better comport with a software user's expectations while operating the software.

Figure 5:
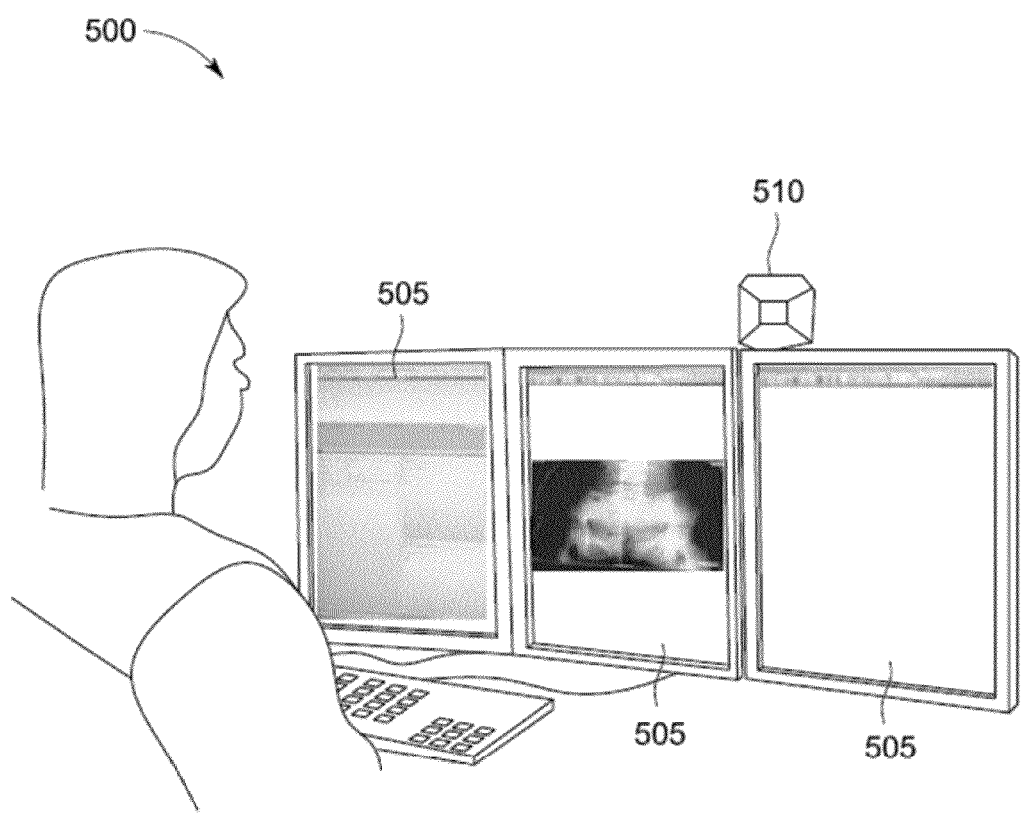
FIG. 5 schematically illustrates a functional block diagram of an example of portions of a method for improving software usability.
Figure 6A:
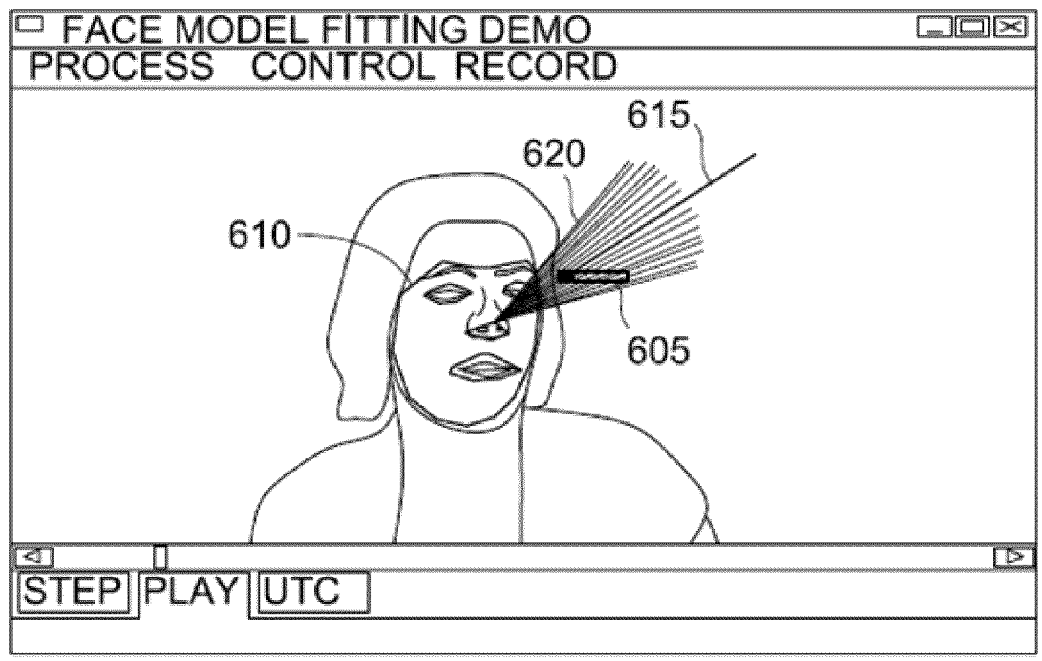
FIGS. 6a-d illustrate some example outputs generated by an example emotive gaze determination and emotion algorithm system.
Figure 6B:
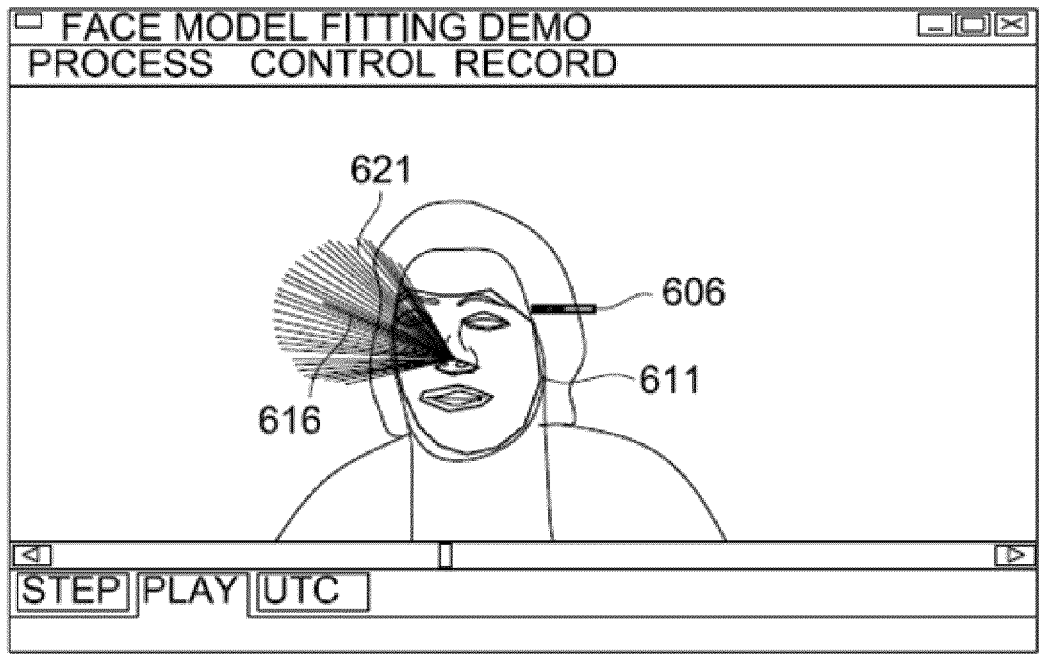
Figure 6C:
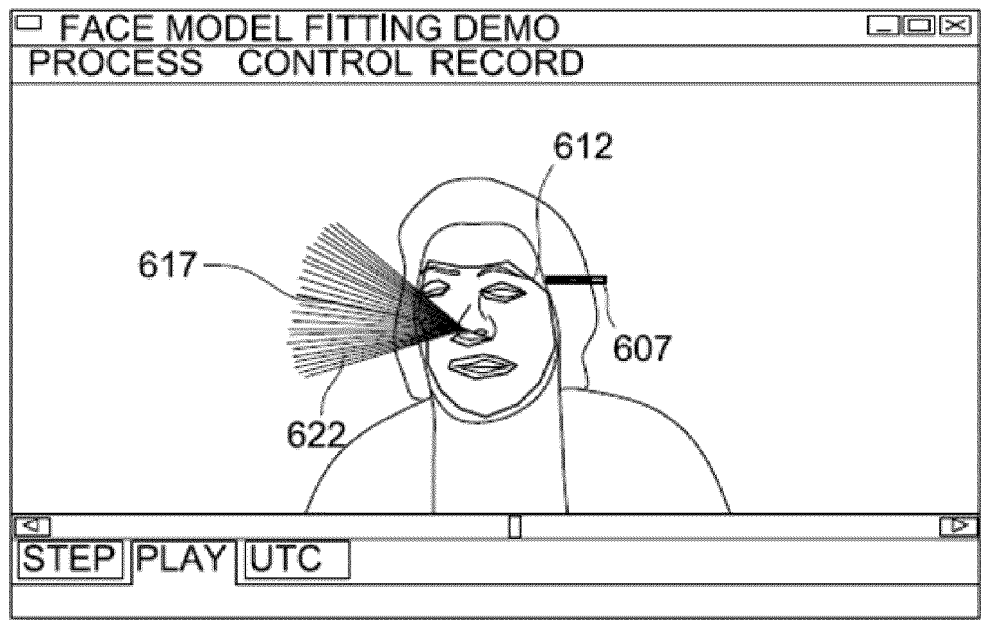
Figure 6D:
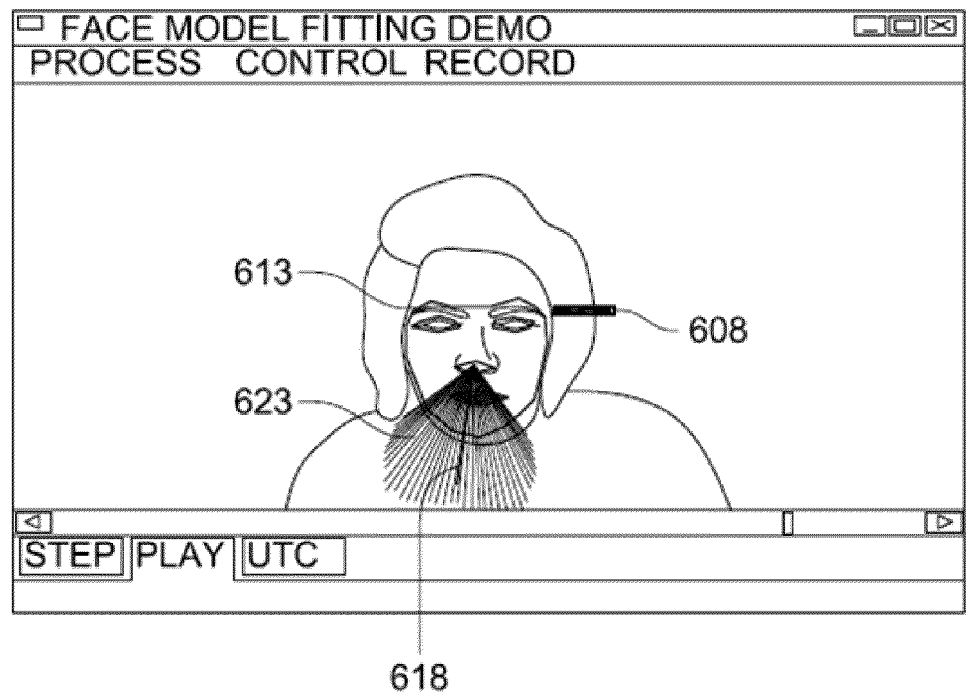

FIG. 5 illustrates an example configuration for recording a software user while operating a software application (e.g., clinical application 110 of FIG. 1). An example configuration may include at least one monitor 505 and at least one camera 510. In the illustrated example of FIG. 5, a software monitor bank consisting of three monitors 505 is shown. In some examples, mounted on top of the monitor bank is the example camera 510. In the illustrated example, the example camera 510 is mounted above the center monitor 505 since the example software application may span across multiple monitors 505. In some examples, the example camera 510 may be a video camera and record an image stream (e.g., a video stream) of the software user while the user is operating the example software application.

In operation, the example camera 510 may be able to observe and capture (e.g., record) an image stream of the user while the software user is operating the example software application. Included in the captured image stream are the software user's facial expressions and the user's gaze direction while the user is operating the example software application.

In some examples, the example camera 510 is a still image camera. In some examples, the example camera 510 may capture a stream of still images (e.g., periodically, aperiodically, on a constant basis, etc.) of the user while the software user is operating the example software application.

In some examples, an example configuration may include multiple cameras 510 mounted to at least one monitor 505. For example, three cameras may be used (e.g., three cameras in a plane, two cameras in a plane and a third camera above/below the plane) to better triangulate the location of a user's facial feature such as, for example, the user's nose. In some examples, multiple cameras may be used to track the movement of the software user's eyes as they continue to operate the software application. In some example configurations, multiple cameras may be used to improve the resolution in gaze determination. In some example configurations, multiple image streams of the software user are simultaneously captured while the user is using the example software application. In some examples, at least one still image camera and at least one video camera are used to capture the software user while the user is operating the example software application.

In some examples, the example captured image stream may be stored locally on an example workstation 312 of FIG. 3. In some examples, the example captured image stream may be stored remotely by transmitting the example image stream to a database (e.g., data center 310 of FIG. 3) via a network 322 of FIG. 3. In some examples, the example captured image stream may be stored locally on the user's workstation 312, and also transmitted to a remote storage database. In some examples, the example captured image stream may be recalled from storage (e.g., local or remote) for processing at a later time.

Once the stream is captured, in some examples, the captured stream may be input into an emotive gaze determination and emotion algorithm ("EGDEA") system for processing. The example EGDEA system may perform facial recognition and gaze angle estimation robustly and reliably. In some examples, the example EGDEA system identifies user emotion levels, including, for example, positive and/or negative reactions, over time from the captured stream.

FIGS. 6a-d are example snapshots of an example software user while using an example software application (e.g., a clinical application, such as, for example, radiology, cardiology, ophthalmology, and/or pathology application) from a captured image stream. In some examples, the EGDEA system may output the results of processing the captured image stream in real-time. For example, the EGDEA system may determine a facial contour of the example software user captured in the example image stream via a facial analysis algorithm. The example snapshots illustrated in FIGS. 6a-d illustrate how the example user's facial contours 610-613 may change over time as the user continues to use the example software application.

In some examples, the EGDEA system may also determine a gaze angle and a gaze area of the example software user captured in the example image stream. In the illustrated examples of FIGS. 6a-d, the gaze angles 615-618 and gaze areas 620-623 may be determined from the user's nose. For example, a contour of the software user's nose may be used to determine a direction in which the nose is pointed and, thus, a direction in which the user's gaze is focused. The example snapshots illustrated in FIGS. 6a-d may illustrate how the example user's gaze angle and gaze area may change over time as the example software user continues to use the example software application. For example, as the example software user moves her focus from a first area of the display (e.g., the gaze angle 615 and the gaze area 620 of FIG. 6a) to a second area of the display (e.g., the gaze angle 618 and the gaze area 623 of FIG. 6d), the EGDEA system processes the user's gaze angle 615 and the gaze area 620 moving and outputs the new gaze angle 618 and the gaze area 623.

In some examples, the EGDEA system may also determine an emotive level of the example software user captured in the example image stream via an example emotion detection algorithm. In some examples, the emotive level may range from a positive (e.g., a smile) or neutral level to a negative (e.g., frustrated) level. The example snapshots illustrated in FIGS. 6a-d illustrate how the user's emotive level 605-608 may change over time as the user continues to use the example software application. For example, as the example user navigates through various usage scenarios and/or software features or functions, the example user may become more frustrated with the usability of the example software application, and the emotive level changes from an initial emotive level 605 (e.g., the neutral reaction illustrated in FIG. 6*a*) to another emotive level 608 (e.g., the negative reaction illustrated in FIG. 6*d*).

In some examples, an example software logging mechanism or application may also be operated with the camera 510 of FIG. 5 in monitoring software usability. In some examples, the example software logging mechanism may capture application state data of the example software application. For example, the example software logging mechanism may log system event logs, user interface screens, and user actions (e.g., mouse location, feature usage, etc.) as the example software user continues to operate the example software application.

In some examples, the example software logging mechanism may be included with the example software application. In some examples, at least some portion of the example software logging mechanism may be installed on the example user workstation 312 of FIG. 3 independently from the example software application.

In some examples, the data captured (e.g., the state information, the user actions, etc.) by the example software logging mechanism may be stored locally on an example workstation 312. In some examples, the captured data by the example software logging mechanism may be stored remotely by transmitting the captured data to a database via network 322 of FIG. 3. In some examples, the data captured by the example software logging mechanism may be stored locally on the user's workstation 312 and also transmitted to a remote storage database. In some examples, the captured data from the example software logging mechanism may be recalled from storage (e.g., local or remote) for processing at a later time.

Figure 7A:
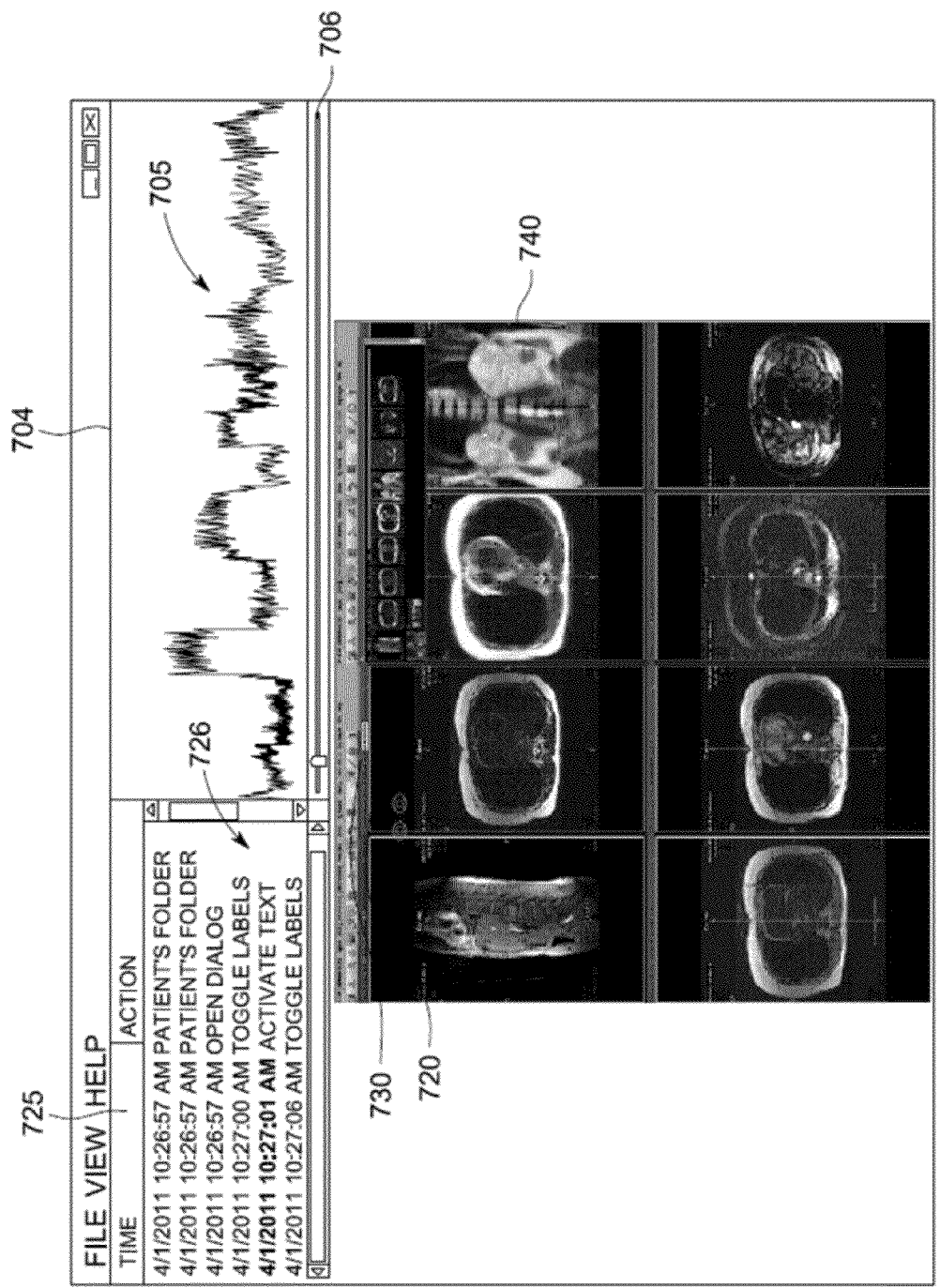
FIGS. 7a-b illustrate some example outputs generated by the system, according to an embodiment of the invention.
Figure 7B:
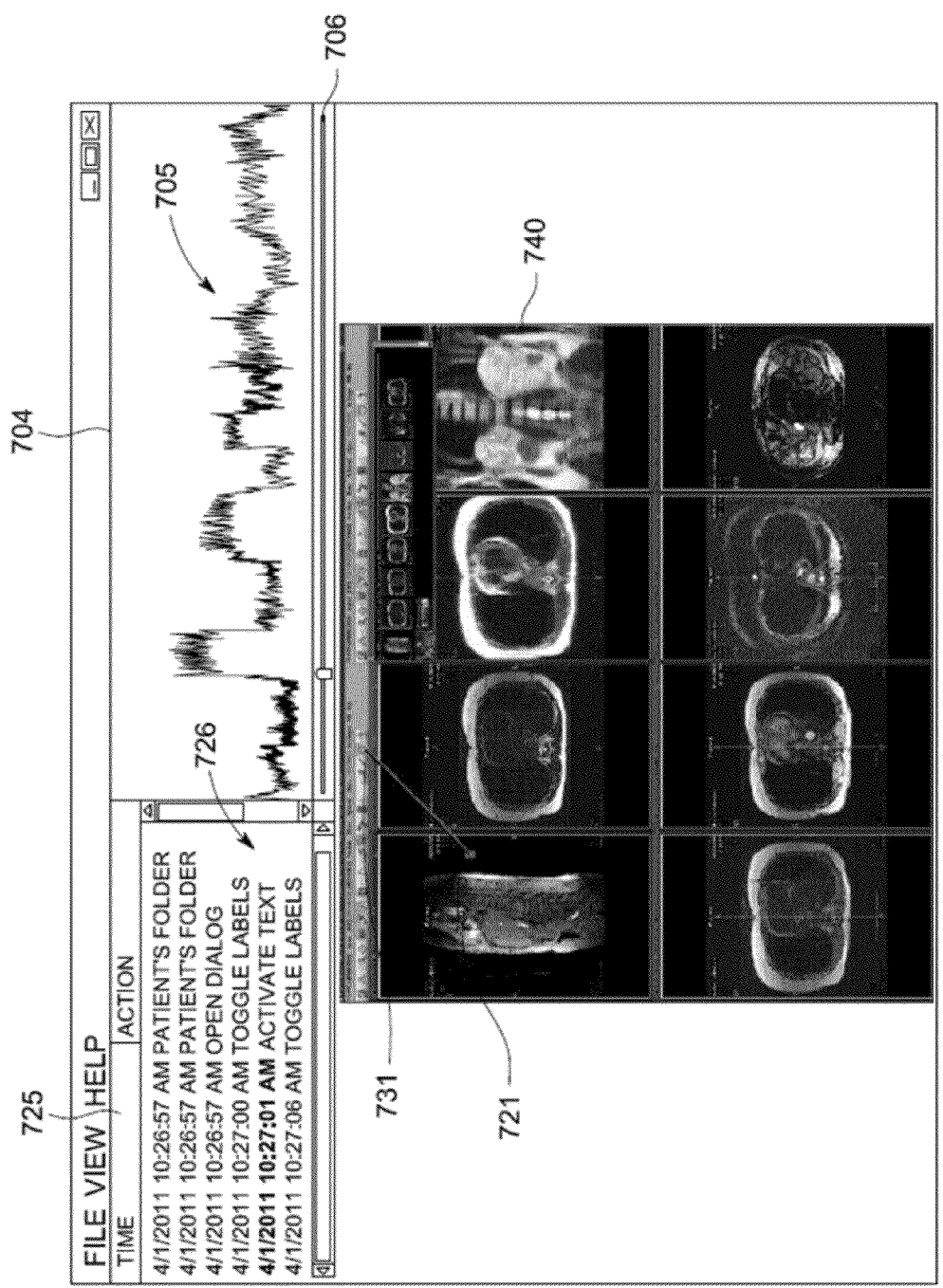

In an attempt to gather software usability information in real-time, an example software simulator may combine the example data captured by the example software logging application and the output of the emotive gaze determination and emotion algorithm system. In some examples, a "Replay & Analyze" simulator which combines the emotion or emotive level information (e.g., low or high frustration level) detected by the emotion detection algorithm and the user event and state log data stored by the software logging mechanism may be provided. For example, FIGS. 7*a*-*b* illustrate example snapshots of a software simulator which may combine the emotive level information detected by the emotion detection algorithm and the user event and state log data saved from the software logging mechanism. The example snapshots of an example software simulator illustrated in FIGS. 1*a*-*b* include an events frame 725, an emotive level frame 704, and a system state frame 740.

The example software simulator replays the activities in the system along with the emotive level synchronized over time. The example software simulator may also display the mouse movements inside the system state frame 740 trailing over a certain time period (e.g., the last 2 seconds). In some examples, the software simulator may include an indicator to display the gaze location in the application (e.g., the "eyes" based on the gaze angle values).

In the example snapshots of FIGS. 7*a*-*b*, the example events frame 725 includes the system events log and an associated timestamp (e.g., data and time) for when each event 726 was executed. For example, at 10:27:01 AM on Apr. 1, 2011, the example software user activated a text label.

The example emotive level frame 704 includes a time bar 706 and the emotive level index 705 determined by the EGDEA system plotted over time. For example, the plotted example emotive level index 705 indicates the example software user had an elevated frustration level at multiple times while operating the example software application during a user workflow. In some examples, the elevated frustration levels may be indicated by a negative reaction to the usability of a certain feature or function of the example software application. In some examples, comparatively lower frustration levels included in the example emotive level index 705 may indicate a neutral or positive reaction to a certain aspect or function of the example software application.

The example system state frame 740 includes the state information (e.g., user actions, mouse movements, user interface screens) of the example software application at specific moments during the example software user's operation of the example software application. For example, the information displayed to the example user on a user interface at a specific moment in time is also displayed in the system state frame 740.

In some examples, the example software simulator may facilitate software reviewer selection of a particular time to analyze the user action and emotion at that time. For example, in the example snapshot illustrated in FIG. 7*a*, the example reviewer has selected the timestamp "Apr. 1, 2011 10:27:01 AM." At the selected time, the software user had activated the text label, as seen in the example events frame 725. The time bar 706 included in emotive level frame 704 adjusts accordingly to the selected timestamp and may indicate the emotive level the example software user experienced at that time (e.g., 10:27:01 AM on Apr. 1, 2011).

The example screenshot of FIG. 7*a* may also include displaying an indicator 720 (e.g., the "eyes") in the identified gaze area and the mouse location or movement 730 at the selected timestamp. For example, at the timestamp "Apr. 1, 2011 10:27:01 AM," the software user was gazing at a blank area in the second frame, and the mouse was located on the toolbar.

As shown in the example events frame 725 of FIG. 7*b* illustrating a later moment in time, no software user event (e.g., feature or function selection) has been performed by the example software user since the previous event was activated. However, the time bar 706 has progressed and a new emotive level index 705 of the example user may be indicated in the emotive level frame 704 (e.g., increased, decreased, stayed the same). The illustrated example screenshot of FIG. 7*b* also includes a new gazing location 721 and a mouse movement trail 731 indicating the change in position of the mouse.

Comparing the change in emotive level, gaze location, and any mouse movement at different moments in time may provide a software reviewer precise data points indicating software user frustration, or satisfaction, with a specific feature or element of a software application. For example, by comparing the changes between the emotive level, gaze location and mouse movement of the example screenshots illustrated in FIGS. 7*a*-*b*, an example software reviewer receives real-time feedback regarding a user's emotive level (e.g., positive, neutral, negative) with a feature (e.g., location or functionality of the "activate text" button) of the example software application (e.g., a clinical application).

Using this example "Replay & Analyze" simulator, it may be possible to identify accurately the feature in the application and the exact workflow which frustrates, or satisfies, a software user. It may also be possible to identify where in the system the software user was looking within the application. For example, the monitoring software logs when the example software user selects a command on the user interface and turns and looks at a portion of the monitor where the example software user intuitively believed the corresponding action to the command should take place. The received feedback may help a product design team realize the "un-intuitiveness" of a feature and may help improve the usability of the product. Furthermore, while reviewing the received feedback, a software user may be able to, for example, choose alterative Graphical User Interfaces ("GUIs") or modify (e.g., correct and/or implement) actions, functions, and/or events in the software to improve the usability and/or efficiency of operating the software application.

For example, some examples may provide an ability to determine and detect poorly designed, unusable, and/or frustrating software user interface(s), which may yield decreased software development costs through tactical identification of areas to improve, and thereby resulting in many benefits including a pleasant and efficient user experience. In other examples, software user interface(s) which resulted in efficient and satisfactory operation by the user may allow software reviewers to focus on implementing similar aspects or features elsewhere into the software. This may be accomplished through providing the ability to use quantitative data to create highly usable new software features (through agile feedback) and identify where to improve existing functionality associated with better software usability, improved user interfaces and focus improvement.

The example software simulator may help to analyze if a software user has to spend a lot of time to find a particular tool or even where the user expects to find the tool. In some examples, it may become possible to determine a better configuration of the tool-buttons or the functional menu items. This example software simulator may be used, for example, by system specialists and application designers to determine a reason for the "un-intuitiveness" of a feature and come up with designs to make a product more user friendly.

Figure 8:
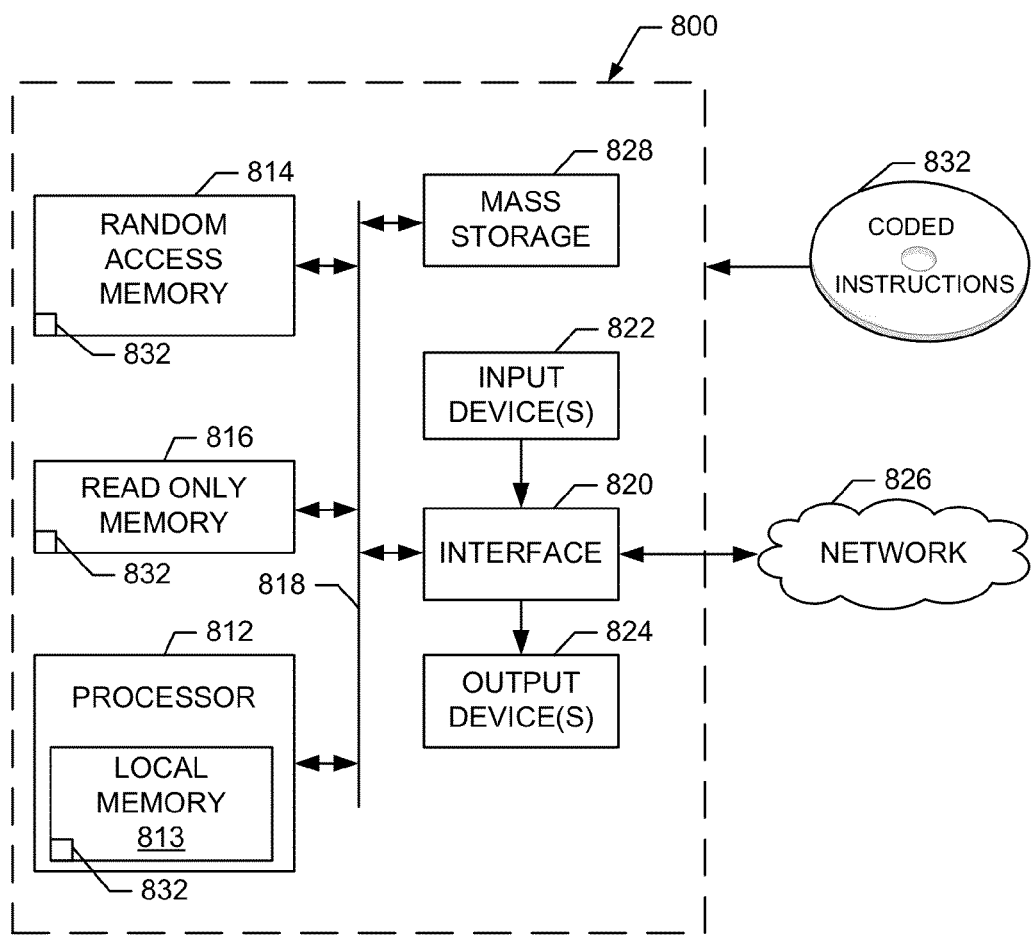
FIG. 8 is a block diagram of an example processor system which may be used to implement systems and methods described herein.

FIG. 8 is a block diagram of an example computer 800 capable of executing the instructions of FIG. 4 to implement the methods and system described herein. The computer 800 may be, for example, a server, a personal computer, a mobile phone (e.g., a cell phone), a personal digital assistant (PDA), an Internet appliance, a DVD player, a CD player, a digital video recorder, a Blu-ray player, a gaming console, a personal video recorder, a set top box, or any other type of computing device.

The system 800 of the instant example includes a processor 812. For example, the processor 812 may be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The computer 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) may be implemented by, for example, a keyboard, a mouse, a touchscreen, a track-pad, a trackball, isopoint and/or a voice recognition system.

One or more output devices 824 are also connected to the interface circuit 820. The output devices 824 may be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The computer 800 also includes one or more mass storage devices 828 for storing software and data. Examples of such mass storage devices 828 include floppy disk drives, hard drive disks, compact disk drives and digital versatile disk (DVD) drives. The mass storage device 828 may implement a local storage device.

The coded instructions 832 of FIG. 4 may be stored in the mass storage device 828, in the volatile memory 814, in the non-volatile memory 816, and/or on a removable storage medium such as a CD or DVD.

From the foregoing, it will appreciate that the above disclosed methods and systems include establishing a correlation between the emotion of a software application user and the usability and/or intuitiveness of the software application, and allowing for unobtrusively identifying areas for improvement and further software development.

It is noted that this patent claims priority from U.S. Provisional Application Ser. No. 61/582,095, which was filed on Dec. 30, 2011, which claims priority from U.S. Provisional Application Serial Number 61/563,318, which was filed on Nov. 23, 2011, and are hereby incorporated by reference in entirety.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to improve software usability, the method comprising:
    providing, with a first software application, feedback with respect to a feature of a second software application, the first software application executed independently from the second software application, the first software application providing feedback with respect to a feature by:
        logging activities of a user while the user is using the second software application, the activities including user actions with respect to the second software application at a first time and a second time and mouse locations on a user interface displaying the second software application at the first time and the second time;
        capturing an image stream of the user while the user is using the second software application, the image stream including gaze locations of the user while the user is using the second software application at the first time and the second time;

interpreting, from the image stream, user emotions of the user while the user is using the second software application at the first time and the second time;

tracking an emotive index of the user with respect to the user using the second software application, wherein the emotive index is based on changes in (1) the user emotions, (2) the gaze locations and (3) the mouse locations between the first time and the second time; and correlating the emotive index with a feature of the second software application based on at least one of a user action or a mouse location of a logged activity at the first time or the second time, wherein the feedback comprises a combination of the image stream of the user, gaze tracking of the user, and the logged activities with respect to the feature of the second software application.

2. The method of claim 1, further comprising providing training to the user based on the feedback.

3. The method of claim 1, further comprising tailoring a workflow for the user based on the feedback.

4. The method of claim 1, further comprising facilitating modification of the second software application based on the feedback.

5. The method of claim 1, wherein capturing the image stream further comprises recording the gaze locations of the user with respect to the user interface.

6. The method of claim 1, wherein the feedback comprises a playback of the combination of the image stream of the user, the gaze tracking of the user, and the logged activities with respect to the feature of the second software application.

7. The method of claim 1, wherein providing the feedback with respect to the feature further comprises:

identifying an area of the user interface of the second software application associated with frustration based on a combination of a screen capture including a gaze representation, mouse movement shown as lines on a screen, an emotive graph, and listing of user actions; and associating the feature with the identified area of the user interface.

8. A non-transitory computer readable medium including computer program code to be executed by a processor, the computer program code, when executed, to implement a method to improve software usability, the method comprising:

providing, with a first software application, feedback with respect to a feature of a second software application, the first software application executed independently from the second software application, the first software application providing feedback with respect to a feature by:

logging activities of a user while the user is using the second software application, the activities including user actions and reactions with respect to the second software application at a first time and a second time and mouse locations on a user interface displaying the second software application at the first time and the second time;

capturing an image stream of the user while the user is using the second software application, the image stream including gaze locations of the user while the user is using the second software application at the first time and the second time;

interpreting, from the image stream, user emotions of the user while the user is using the second software application at the first time and the second time;

tracking an emotive index of the user with respect to the user using the second software application, wherein the emotive index is based on changes in (1) the user emotions, (2) the gaze locations and (3) the mouse locations between the first time and the second time; and correlating the emotive index with a feature of the second software application based on at least one of a user action or a mouse location of a logged activity at the first time or the second time, wherein the feedback comprises a combination of the image stream of the user, gaze tracking of the user, and the logged activities with respect to the feature of the second software application.

9. The non-transitory computer readable medium of claim 8, the method further comprising providing training to the user based on the feedback.

10. The non-transitory computer readable medium of claim 8, the method further comprising tailoring a workflow for the user based on the feedback.

11. The non-transitory computer readable medium of claim 8, the method further comprising facilitating modification of the second software application based on the feedback.

12. The non-transitory computer readable medium of claim 8, wherein the method further comprises capturing the image stream by recording the gaze locations of the user with respect to the user interface.

13. The non-transitory computer readable medium of claim 8, wherein the feedback comprises a playback of the combination of the image stream of the user, the gaze tracking of the user, and the logged activities with respect to the feature of the second software application.

14. The non-transitory computer readable medium of claim 8, wherein the method further comprises providing the feedback with respect to the feature by:

identifying an area of the user interface of the second software application associated with frustration based on a combination of a screen capture including a user gaze representation, mouse movement shown as lines on a screen, an emotive graph, and listing of user actions; and associating the feature with the identified area of the user interface.

15. A system to improve software usability comprising:

a processor; and a memory having machine readable instructions stored thereon which, when executed, cause the processor to at least:

log, with a first software application, activities of a user while the user is using a second software application, the second software application to display to the user via a user interface, wherein the activities to include user actions with respect to the second software application at a first time and a second time and mouse locations on the user interface displaying the second software application at the first time and the second time;

capture, with the first software application, an image stream of the user while the user is using the second software application, wherein the image stream is to include gaze locations of the user while the user is using the second software application at the first time and the second time;

interpret, with the first software application, user emotions of the user while the user is using the second software application, wherein the user emotions are interpreted from the image stream at the first time and the second time;

track, with the first software application, an emotive index of the user with respect to the user using the second software application, wherein the emotive index is based on changes in (1) the user emotions, (2) the gaze locations and (3) the mouse locations between the first time and the second time;

correlate the emotive index with a feature of the second software application based on at least one of user action or a mouse location of a logged activity at the first time or the second time; and provide feedback with respect to the feature of the second software application, the feedback to comprise a combination of the image stream of the user, gaze tracking of the user, and the logged activities with respect to the feature of the second software application.

16. The system of claim 15, wherein the instructions cause the processor to provide training to the user based on the feedback.

17. The system of claim 15, wherein the instructions cause the processor to tailor a workflow for the user based on the feedback.

18. The system of claim 15, wherein the instructions cause the processor to facilitate modification of the second software application based on the feedback.

19. The system of claim 15, wherein the instructions cause the processor to capture the image stream by recording the gaze locations of the user with respect to the user interface.

20. The system of claim 15, wherein the feedback comprises a playback of the combination of the image stream of the user, the gaze tracking of the user, and the logged activities with respect to the feature of the second software application.

21. The system of claim 15, wherein to provide the feedback with respect to the feature further comprises instructions to cause the processor to:

identify an area of the user interface of the second software application associated with frustration based on a combination of screen captures including gaze representations, mouse movement shown as lines on a screen, an emotive graph, and listing of user actions; and associate the feature with the identified area of the user interface.

* * * * *